(12) United States Patent
Manga (10) Patent No.: US 11,149,418 B2
(45) Date of Patent: Oct. 19, 2021

(54) FAUCET HANDLE HUB

(71) Applicant: Brasstech, Inc., Santa Ana, CA (US)

(72) Inventor: Joseph Manga, Irvine, CA (US)

(73) Assignee: Brasstech, Inc., Santa Ana, CA (US)

( * ) Notice: Subject to any disclaimer, the term of this patent is extended or adjusted under 35 U.S.C. 154(b) by 122 days.

(21) Appl. No.: 16/283,386

(22) Filed: Feb. 22, 2019

(65) Prior Publication Data

US 2020/0270852 A1 Aug. 27, 2020

(51) Int. Cl.
*E03C 1/04* (2006.01)
*F16K 11/078* (2006.01)
*F16K 31/60* (2006.01)

(52) U.S. Cl.
CPC ........ *E03C 1/0412* (2013.01); *F16K 11/0787* (2013.01); *F16K 31/605* (2013.01)

(58) Field of Classification Search
USPC ........................................................ 137/801
See application file for complete search history.

(56) References Cited

U.S. PATENT DOCUMENTS

| | | | |
|---|---|---|---|
| 4,653,535 A | 3/1987 | Bergmann | |
| 6,179,130 B1 | 1/2001 | Nguyen et al. | |
| 6,868,994 B2 | 3/2005 | Kawolics | |
| 6,981,693 B1* | 1/2006 | Chang | F16K 11/0787 137/603 |
| 7,032,619 B2* | 4/2006 | Gaenzle | E03C 1/04 137/615 |
| 7,198,064 B1* | 4/2007 | Hsiao | F16K 27/044 137/625.4 |
| 7,490,619 B2 | 2/2009 | Farag et al. | |
| 7,886,763 B2 | 2/2011 | Smith et al. | |
| 8,156,963 B2 | 4/2012 | Lopp et al. | |
| 8,567,284 B2* | 10/2013 | Huang | F16K 31/60 74/543 |
| 9,677,254 B2 | 6/2017 | Prabhakar et al. | |
| 10,053,842 B2* | 8/2018 | Lange | E03C 1/0412 |
| 10,167,964 B1* | 1/2019 | Chang | F16K 11/0746 |
| 2008/0054210 A1 | 3/2008 | Smith | |
| 2011/0011389 A1* | 1/2011 | Ryu | F23D 14/06 126/39 E |
| 2011/0197984 A1* | 8/2011 | Thomas | F16K 47/026 137/625.4 |
| 2012/0222763 A1* | 9/2012 | Yang | F16K 17/34 137/625.4 |
| 2012/0248351 A1* | 10/2012 | Huang | E03C 1/055 251/129.01 |
| 2013/0036853 A1* | 2/2013 | Huang | F16K 31/60 74/523 |
| 2013/0160881 A1* | 6/2013 | Kuo | E03C 1/04 137/801 |

(Continued)

OTHER PUBLICATIONS

Alibaba, Bathroom Fittings High Body Faucet Washing Basin Bronze Antique Copper Mixer, retrieved from https://www.alibaba.com/product-detail/Bathroom-Fittings-High-Body-Faucet-Washing_1825792712.html?spm=a2700.7724857.normalList57.5b84428beJjvfo on Sep. 11, 2018.
Kohler K-596-VS Vibrant Stainless Simplice Single-Hole Kitchen, retrieved from https://www.build.com/kohler-k-596-kitchen-faucet/s563679?uid=1770065&source=gg-gba-pla_1770065!c959262446!a46509172966!dc!ng&gclid=Cj0KCQjww8jcBRDZARIsAJGCSGt8Jg03TOpwG-hgAr1SkdO5Vx6s5ow6le4NfZGM9aegn6VTdl319LcaAk94EALw_wcB, on Sep. 7, 2018.

(Continued)

*Primary Examiner* — Daphne M Barry
(74) *Attorney, Agent, or Firm* — Boses McKinney & Evans LLP (57) ABSTRACT

A valve assembly for a faucet including a valve cartridge having a valve stem and supported within a valve body, a handle operably coupled to the valve stem, a handle hub supported for rotation relative to the valve body, and a coupler operably coupling the valve stem with the handle hub.

22 Claims, 10 Drawing Sheets

(56) References Cited

U.S. PATENT DOCUMENTS

| | | | | |
|---|---|---|---|---|
| 2013/0263936 A1* | 10/2013 | DeVries | ................ | E03C 1/0401 |
| | | | | 137/315.01 |
| 2014/0090722 A1* | 4/2014 | Lange | ................ | F16K 11/0787 |
| | | | | 137/343 |
| 2014/0215710 A1* | 8/2014 | Christ | ................ | E03C 1/0412 |
| | | | | 4/677 |
| 2015/0055433 A1* | 2/2015 | Lange | ................ | B01F 15/026 |
| | | | | 366/132 |
| 2015/0211646 A1* | 7/2015 | Kemp | ................ | F16K 19/006 |
| | | | | 137/625.17 |
| 2016/0018011 A1* | 1/2016 | Lange | ................ | F16K 27/045 |
| | | | | 137/625.44 |
| 2016/0168829 A1* | 6/2016 | Chen | ................ | F16K 11/056 |
| | | | | 137/625.41 |
| 2019/0170263 A1* | 6/2019 | Sell | ................ | F16K 11/0787 |

OTHER PUBLICATIONS

Grohe 33330001 Starlight Chrome Eurodisc Pull-Out Kitchen Faucet, retrieved from https://www.build.com/grohe-33-330-kitchen-faucet/s173555?uid=1594063&source=gg-gba-pla_1594063!c959262446!a46509172966!dc!ng&gclid=Cj0KCQjww8jcBRDZARIsAJGCSGtOLMD-NX57HgLdIIFWQsbM1uGueNMTzlh18v3l80SRhvtTAJsca-UaApDnEALw_wcB, on Sep. 7, 2018.

Grohe 22665001 Starlight Chrome Concetto Pull-Down High-Arc Kit, retrieved from https://www.build.com/grohe-32-665-kitchen-faucet/s163597?uid=1594165&source=gg-gba-pla_1594165!c959262446!a46509172966!dc!ng&gclid=Cj0KCQjww8jcBRDZARIsAJGCSGvq6B-aklrhgPtriU2NjuJ2hz8rouXHxrOppFGSVkeD8KM8NGnAHyAaAuyuEALw_wcB, on Sep. 7, 2018.

* cited by examiner

FAUCET HANDLE HUB

BACKGROUND AND SUMMARY OF THE DISCLOSURE

The present invention relates to a valve assembly for a faucet and, more particularly, to a faucet valve assembly including a coupler between a valve stem and a handle hub.

Conventional faucet valve assemblies may include a lever coupled to a valve stem of a cartridge valve, with a handle hub covering at least the base of the lever and the top of the cartridge valve. In some valve assemblies, movement of the handle hub is facilitated by movement of the lever through an insert that is coupled to both the lever and the handle hub. In other valve assemblies, the lever and the handle hub may be manufactured as one piece. The handle hub may be affixed to a body of the valve assembly using an o-ring to prevent the handle hub from falling off the body. For the lever and the handle hub of such conventional valve assemblies to operate together, a very tight tolerance is required, which may result in an unpleasing aesthetic design, difficulty in manufacturing, difficulty in assembly and inconsistent function due to the normal dimensional variation of the mating components. As such, there is a need for a valve assembly which allows for a smoother movement of the valve assembly- and therefore a more efficient function.

According to an illustrative embodiment of the present disclosure, a valve assembly for a faucet includes a valve body defining a longitudinal axis, and a valve cartridge supported by the valve body. The valve cartridge includes a cartridge housing, a moveable valve member received within the cartridge housing, and a longitudinally extending valve stem operably coupled to the moveable valve member. A handle is operably coupled to the valve stem so that the valve stem rotates simultaneously with the handle. A handle hub is supported for rotation relative to the valve body. A coupler is supported by the cartridge housing and operably couples the valve stem with the handle hub. The coupler includes a coupler base and a coupler engagement member extending longitudinally from the coupler base and outwardly from the cartridge housing. The coupler base is disposed at least partially around the cartridge stem, and the coupler engagement member is coupled to the handle hub.

According to another illustrative embodiment of the present disclosure, a valve assembly for a faucet includes a cartridge housing, and a valve stem disposed within the cartridge housing and extending longitudinally away from the cartridge housing. A coupler is operably coupled to the cartridge housing. The coupler includes a coupler base and a coupler engagement member coupled to and extending longitudinally away from the coupler base. The coupler base is disposed at least partially around the valve stem and includes a lower slot to allow pivoting movement of the valve stem. The coupler engagement member includes a plurality of circumferentially spaced slots. A moveable valve member is received within the cartridge housing and includes a top face, a bottom face, a recess formed with the bottom face, and a stage supported by the top face. The stage is received within the lower slot of the coupler base and is operably coupled to a lower end of the valve stem. A lever is operably coupled to the valve stem so that the valve stem and the moveable valve member move concurrently with the lever. A handle hub includes a hub engagement member having a plurality of prongs that cooperate with the slots of the coupler engagement member so that the valve stem and the moveable valve member rotate simultaneously with the coupler engagement member and the handle hub.

According to a further illustrative embodiment of the present disclosure, a faucet assembly includes a valve body defining a longitudinal axis and including a hot water inlet, a cold water inlet, and a mixed water outlet. A valve cartridge is received within the valve body and includes a cartridge housing, a retainer including a hot water inlet, a cold water inlet, and a mixed water outlet in fluid communication with the hot water inlet, the cold water inlet, and the mixed water outlet of the valve body, respectively. The valve cartridge further includes a stationary valve member coupled to and positioned above the retainer, the stationary valve member including a hot water inlet aperture, a cold water inlet aperture, and a mixed water outlet aperture in fluid communication with the hot water inlet, the cold water inlet, and the mixed water outlet of the retainer, respectively, the stationary valve member further including a top face. A moveable valve member is positioned above the stationary valve member, the moveable valve member including a top face, a bottom face, a recess formed by the bottom face, and a stage disposed on the top face. The stage forms an opening, wherein the bottom face of the moveable valve member contacts the top face of the stationary valve member, and the recess is configured to be in selective fluid communication with at least one of the hot water inlet aperture, the cold water inlet aperture, and the mixed water outlet aperture of the stationary valve member. A coupler is received within the cartridge housing, and includes a coupler base and a coupler engagement member. The coupler base includes a groove receiving the stage of the moveable valve member and includes a through-hole. A valve stem is received within the coupler, a lower portion of the valve stem disposed within the groove formed by the coupler so that a lower end of the valve stem is received by the opening of the stage of the moveable valve member and is configured to move within the groove of the coupler. A pivot pin is received within the through-hole of the coupler base and supports the valve stem for pivoting movement. The coupler engagement member is coupled to and extends away from the cartridge housing and is disposed at least partially around the cartridge stem, the coupler engagement member defining a plurality of slots. A lever is coupled to the valve stem so that the valve stem and the moveable valve member move substantially simultaneously with the lever. A handle hub includes a hub engagement having a plurality of prongs that correspond with and couple with the slots of the coupler engagement member so that the valve stem and the moveable valve member rotate simultaneously with the coupler engagement member and the handle hub.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

A detailed description of the drawings particularly refers to the accompanying figures in which.

DETAILED DESCRIPTION OF THE DRAWINGS

The embodiments of the invention described herein are not intended to be exhaustive or to limit the invention to the precise forms disclosed. Rather, the embodiments selected for description have been chosen to enable one skilled in the art to practice the invention.

Figure 1:
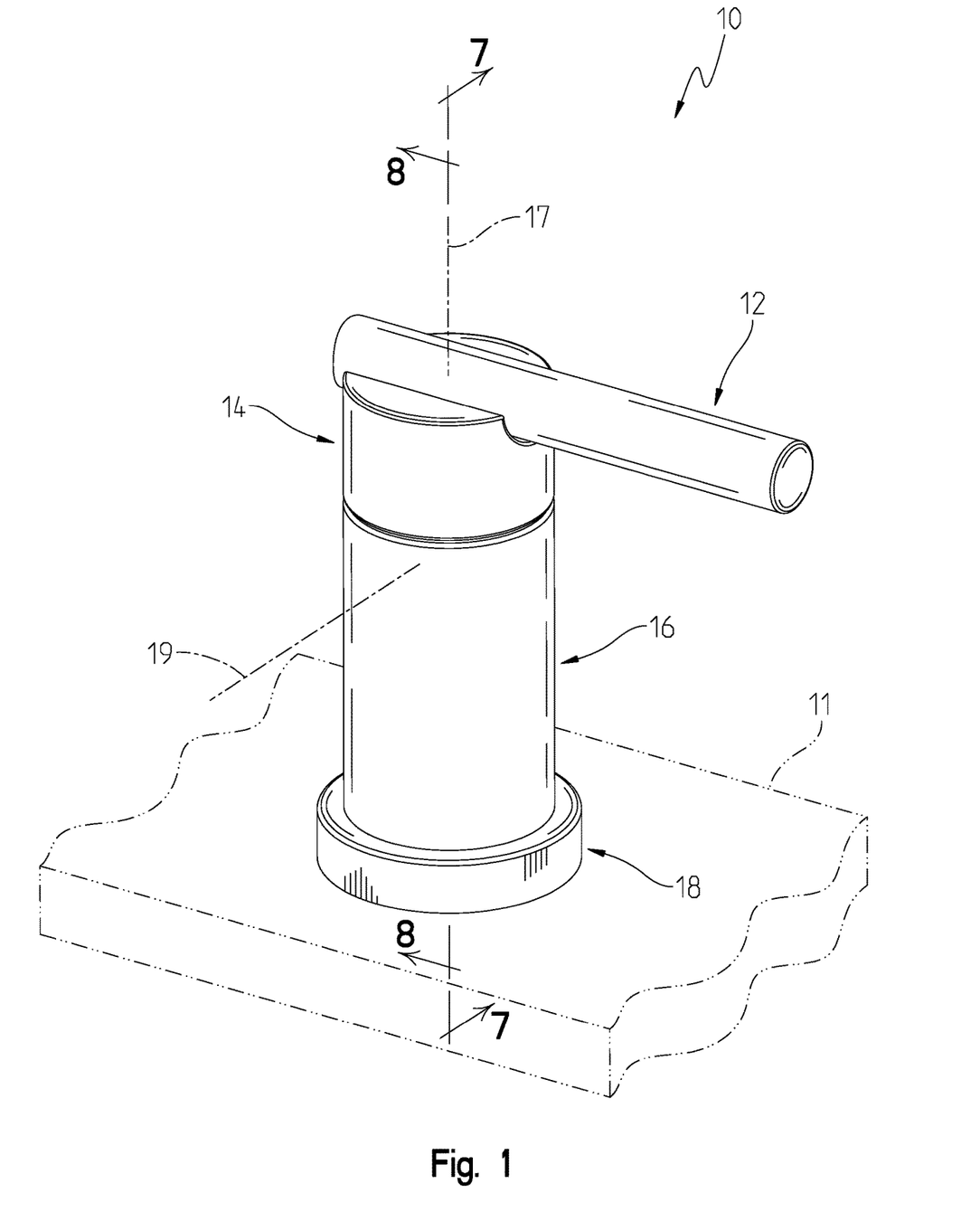
FIG. 1 is a perspective view of an illustrative valve assembly for a faucet, wherein the lever is supported for rotation about a longitudinal axis and for pivoting movement about a perpendicular axis.

Referring initially to FIG. 1, an illustrative valve assembly 10 is shown. In an illustrative embodiment, the valve assembly 10 may be coupled to a body (e.g., a hub or a delivery spout) of a faucet (such as a kitchen faucet including a pulldown sprayhead). In another illustrative embodiment, the valve assembly 10 may be coupled to a sink deck 11 for controlling water flow through the outlet of an adjacent faucet spout. The valve assembly 10 illustratively includes a handle 12, a handle hub 14, a handle or valve body 16, and a mounting or coupling ring 18. The handle 12 may comprise a conventional user input, such as a lever or knob. The coupling ring 18 couples the handle or valve body 16 to either the body of the faucet assembly or the sink deck 11. The valve body 16 illustratively receives a valve cartridge 22 (FIG. 2), discussed below, which couples independently to the handle hub 14 and the handle 12, so that when a user moves the handle 12, components of the valve cartridge 22 (FIG. 2) also move to control water flow through the respective faucet assembly.

Figure 5:
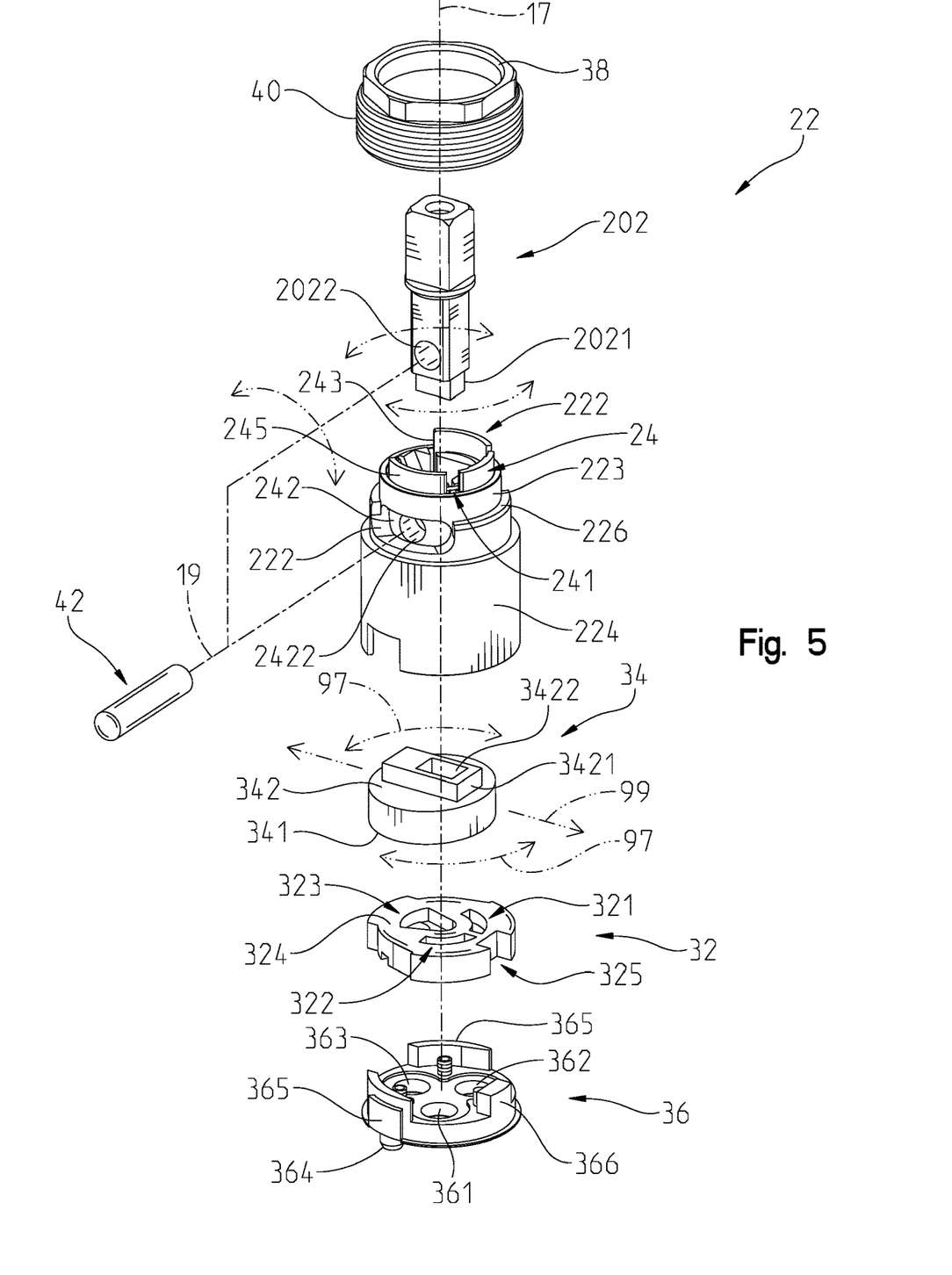
FIG. 5 is an exploded perspective view of a valve cartridge of the illustrative valve assembly of FIG. 1.

In an illustrative embodiment, the handle 12 of the valve assembly 10 may be rotated about an axis substantially parallel to a longitudinal axis 17 of the valve body 16 or about the longitudinal axis 17 of the valve body 16. In a further illustrative embodiment, the handle 12 of the valve assembly 10 may be lifted in a direction substantially away from the coupling ring 18 of the valve assembly 10 for pivoting movement about an axis 19 orthogonal or perpendicular to the longitudinal axis 17, as illustrated in FIGS. 1 and 5. In yet another illustrative embodiment, the handle 12 of the valve assembly 10 may be capable of both rotating about an axis substantially parallel to the longitudinal axis 17 of the valve body 16 and being lifted in a direction substantially away from the coupling ring 18 of the valve assembly 10 for pivoting movement about axis 19. For example, in a faucet assembly having a single cartridge valve-style handle, the handle 12 of the valve assembly may be lifted to pivot about axis 19 to control the water flow velocity or rate of the faucet, wherein various angles of the lever correspond with various rates of water flow. In either a faucet assembly having a single cartridge valve-style handle or a faucet assembly having dual cartridge valve-style handles, the handle 12 of the valve assembly 10 may be rotated about axis 17 to control the temperature of the water flow for the respective faucet assembly. Further, in either a faucet assembly having a single cartridge valve-style handle or a faucet assembly having dual cartridge valve-style handles, the handle 12 of the valve assembly 10 may be rotated to control the water flow rate for the respective faucet assembly.

Figure 2:
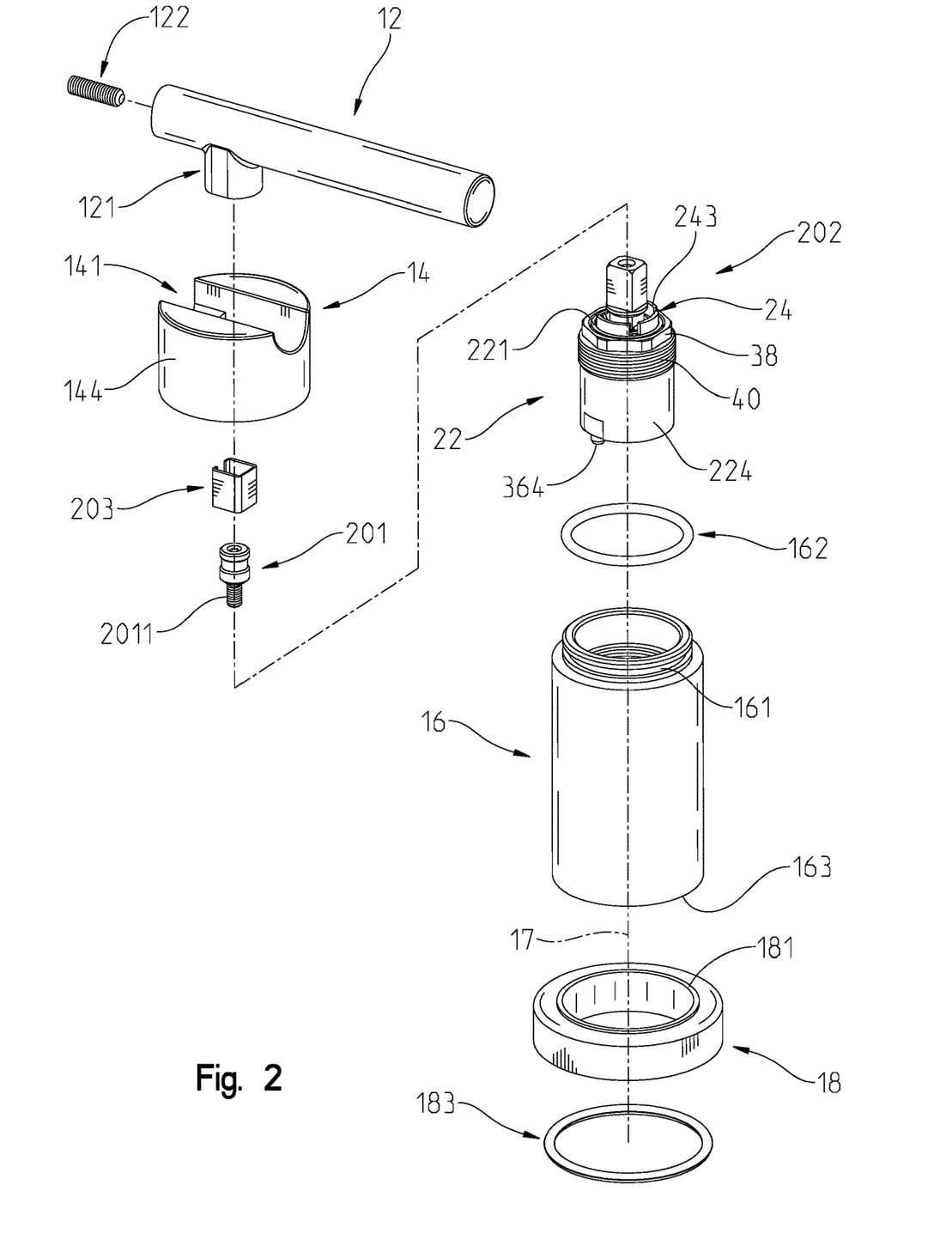
FIG. 2 is an exploded top perspective view of the illustrative valve assembly of FIG. 1.
Figure 3:
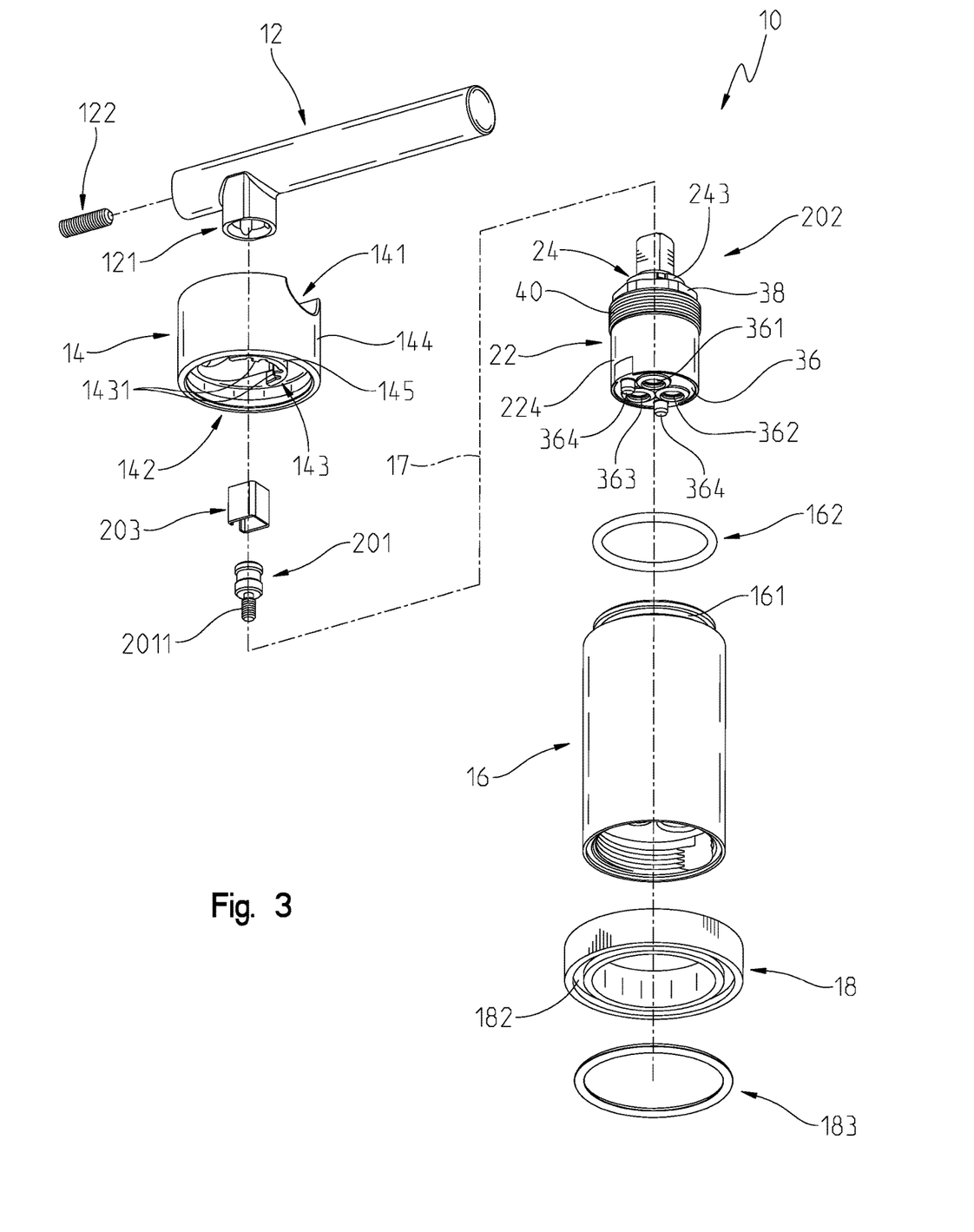
FIG. 3 is an exploded bottom perspective view of the illustrative valve assembly of FIG. 1.
Figure 4:
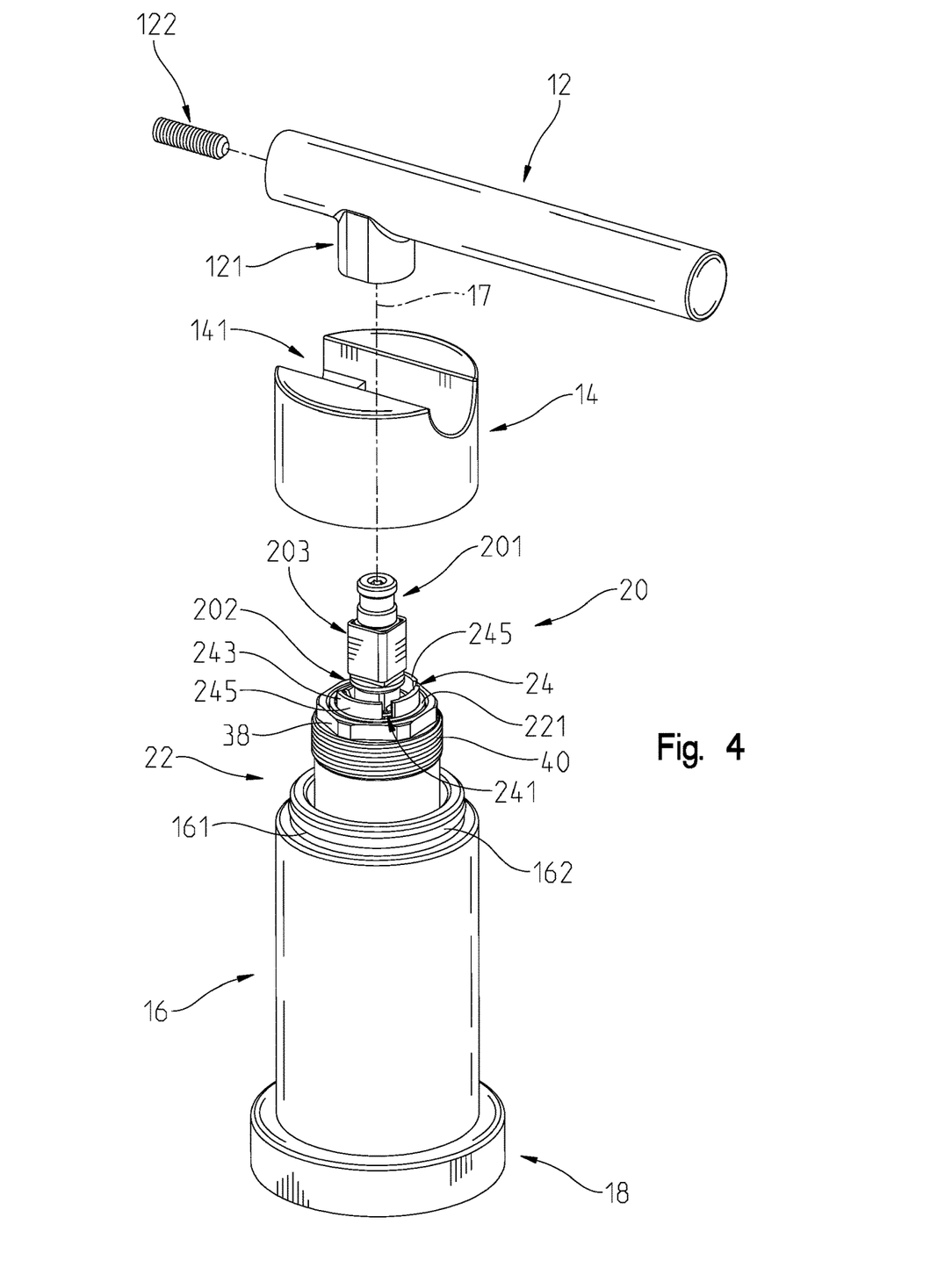
FIG. 4 is a partially exploded perspective view of the valve assembly of FIG. 1, showing a cartridge valve coupler for coupling a valve stem to a handle hub.

Referring now to FIGS. 2 and 3, an exploded perspective view of the valve assembly 10 illustrates the inner components of the valve assembly 10. Illustratively, the handle 12 comprises a lever configured to sit within a hub groove 141 of the handle hub 14 so that a handle stem 121 passes through the handle hub 14 and engages with a cartridge valve stem 20 (FIG. 4). The handle hub 14 illustratively includes a cylindrical outer wall 144 configured to fit over the valve cartridge 22 and an inner arcuate wall 145 with prongs 1431 extending radially inward from the wall 145 (FIG. 3). The inner arcuate wall 145 and the prongs 1431 combine to form a hub engagement member 143. The cartridge valve stem 20 illustratively includes an upper cartridge valve stem 201 with threading 2011 to engage with a cartridge valve stem body 202 to couple the upper cartridge valve stem 201 to the cartridge valve stem body 202. The cartridge valve stem 20 (FIG. 4) also includes a stem cover 203 to fit on the outside of the cartridge valve stem body 202.

The cartridge valve stem 20 is illustratively disposed within the center of the valve cartridge 22 and is surrounded by a cartridge valve coupler 24. More particularly, the cartridge valve coupler 24 is disposed within the interior of the upper lip 221 (FIG. 2) of the valve cartridge 22 and interacts with the hub engagement member 143 (FIG. 3) of the handle hub 14 as described below. A retaining or bonnet nut 38 is fitted on the exterior of the upper lip 221 (FIG. 2) of the valve cartridge 22 to hold the valve cartridge 22 in place within the valve body 16. The valve cartridge 22 may further include feet 364 to interact with sockets (not shown) within the valve body 16 of the faucet assembly to facilitate rotational orientation. In an illustrative embodiment, the valve cartridge 22 may include a hot water inlet 361, a cold water inlet 362, and a tempered or mixed water outlet 363 in an aperture disc or retainer 36 (FIG. 3) of the valve cartridge 22. The inlets 361, 362 and outlet 363 (FIG. 3) are present in illustrative embodiments where the valve assembly 10 controls the temperature of the water flow of the respective faucet assembly. In other illustrative embodiments, alternative inlets or outlets may or may not be present.

Still referring to FIGS. 2 and 3, the valve body 16 illustratively includes a friction groove 161 configured to hold an o-ring 162 when the valve assembly 10 is assembled. The o-ring 162 may be comprised of an elastic polymer, such as rubber, to facilitate a tight, friction fit connection between the valve body 16 and the handle hub 14 when the valve assembly 10 is assembled. The o-ring 162 keeps the handle hub 14 from falling off the valve body 16 while still allowing enough rotational movement of the handle hub 14 to operate the respective faucet assembly. In other words, the o-ring 162 retains the handle hub 14 on the valve body 16 in an axial direction while permitting rotation therebetween.

The valve body 16 is illustratively supported upon the coupling ring 18. More particularly, in an illustrative embodiment, the lower lip 163 of the valve body 16 fits over a protruding lip 181 (FIG. 2) of the coupling ring 18 and may otherwise be removably or fixedly attached to the coupling ring 18 where the protruding lip 181 of the coupling ring 18 meets the lower lip 163 of the valve body 16. In another illustrative embodiment, the coupling ring 18 may not include a protruding lip 181 and may otherwise couple to the valve body 16 through other means, such as, but not limited to, threading, welding, adhesive, or manufacturing the valve body 16 and the coupling ring 18 as one piece.

In an illustrative embodiment, the coupling ring 18 also includes a friction groove 182 (FIG. 3) configured to hold an o-ring 183 when the valve assembly 10 is assembled. The o-ring 183 may be comprised of an elastic polymer, such as rubber, to facilitate a tight, friction fit, liquid seal between the coupling ring 18 and the sink deck 11 (FIG. 1) or faucet body. In other embodiments, the coupling ring 18 may be manufactured as one piece with the respective faucet assembly deck or faucet body or otherwise fixedly attached to the respective sink deck 11 or faucet body.

Now referring to FIG. 4, a coupling structure of the valve assembly 10 is shown in further detail. More particularly, as discussed above, the coupling ring 18 supports the valve body 16 to hold the valve body 16 in a substantially upright position relative to the sink deck 11 (FIG. 1) or faucet body. The o-ring 162 is fitted within the friction groove 161 of the valve body 16 to facilitate the coupling of the valve body 16 with the handle hub 14. The valve cartridge 22 is disposed within the valve body 16 and may be held in place via threading 40 and/or retaining nut 38. In an illustrative embodiment, threading 40 and retaining nut 38 may be one piece, such as a bonnet nut. In another illustrative embodiment, threading 40 and retaining nut 38 may be formed in two pieces.

The cartridge valve stem 20 illustratively includes the stem cover 203, the upper cartridge valve stem 201, and the cartridge valve stem body 202 received within the center of the top of the valve cartridge 22 in such a way that allows the cartridge valve stem 20 to be extending from the valve cartridge 22 in a substantially upright direction. The cartridge valve coupler 24 illustratively includes a coupler base 242 (FIG. 7) and a coupler engagement member 243 extending longitudinally from the coupler base 242 (FIG. 7) and outwardly from a cartridge housing 224. Illustratively, the coupler base 242 and the coupler engagement member 243 may be molded from a thermoplastic as a single component to form the cartridge valve coupler 24. The coupler base 242 of the cartridge valve coupler 24 is illustratively disposed around the cartridge valve stem 20 just inside the upper lip 221 of the valve cartridge 22. The cartridge valve coupler 24 is coupled to the valve cartridge 22 so that the coupler engagement member 243 extends beyond the upper lip 221 of the valve cartridge 22 in an arcuate manner around the cartridge valve stem 20. The coupler engagement member 243 illustratively includes a plurality of circumferentially spaced slots 241 defined by tabs 245.

The handle hub fits 14 illustratively fits over the top of the valve body 16 to friction fit to the valve body 16 via the o-ring 162. An opening 142 (FIG. 3) formed by the handle hub 14 allows the cartridge valve stem 20 to pass through the handle hub 14 and engage with the handle 12. The handle hub 14 couples with the valve body 16 in a manner that allows the cartridge valve coupler 24 to couple with the hub engagement member 143 (FIG. 3). Illustratively, the opening 142 (FIG. 3) of the handle hub 14 also receives the handle stem 121 of the handle 12 so that the handle 12 fits within the hub groove 141. The handle stem 121 receives the cartridge valve stem 20 so that the stem cover 203 fits snugly within an interior surface of the handle stem 121, holding the cartridge valve stem 20 in place within the handle stem 121. For additional support, a handle engagement 122 may be inserted into the handle 12 to further secure the cartridge valve stem 20 within the handle 12 as described below in reference to FIG. 5.

Referring now to FIG. 5, the valve cartridge 22 is shown. In an illustrative embodiment, valve cartridge 22 is a closed mixing valve cartridge. The valve cartridge 22 includes a retainer or aperture disc 36, which defines the hot water inlet 361, the cold water inlet 362, and the tempered or mixed water outlet 363. The retainer 36 form fits with the valve cartridge body 224 via tabs 365 on the retainer 36 and the slots 225 on the valve cartridge 22. When assembled, a stationary valve member or disc 32 is disposed within the valve cartridge 22 above the retainer 36, and form fits with the retainer 36 via a protrusion 366 on the retainer 36 which fits into an opening 325 defined by the stationary valve member 32. The interaction between the retainer 36, the stationary valve member 32 and the valve cartridge 22 holds the stationary valve member 32 in place within the valve cartridge 22.

Figure 6:
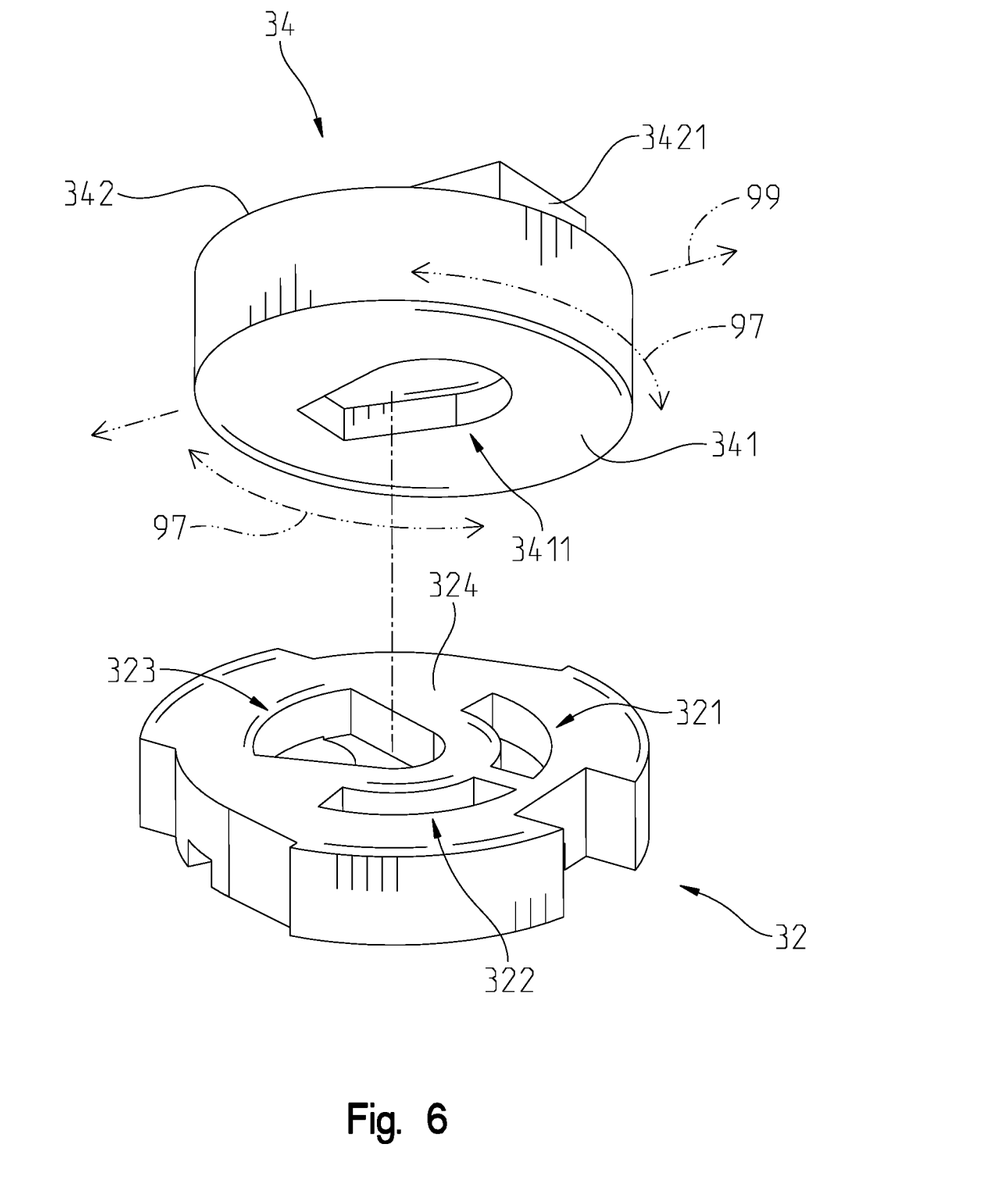
FIG. 6 is an exploded perspective view of a stationary valve member and a moveable valve member of the valve cartridge of FIG. 5.

Now referring to FIGS. 5 and 6, the stationary valve member 32 illustratively includes a hot water aperture 321, a cold water aperture 322, and a tempered or mixed water aperture 323 that correspond with (i.e., in fluid communication with) the hot water inlet 361, the cold water inlet 362, and the mixed water outlet 363 of the retainer 36 of the valve cartridge 22 respectively. A moveable valve member or disc 34 is also disposed within the valve cartridge 22 and sits on top of the stationary valve member 32. Referring specifically to FIG. 6, the moveable valve member 34 illustratively includes a bottom face 341 and a top face 342. The bottom face 341 touches and is configured to slide (translate) across a top surface 324 of the stationary valve member 32. Additionally, the bottom face 341 of the moveable valve member 34 includes a recess 3411 that is capable of being in selective fluid communication with any or all of the hot water aperture 321, the cold water aperture 322, or the mixed water aperture 323 of the stationary valve member 32. The top face 342 of the moveable valve member 34 defines a stage 3421 with an opening 3422 sized to fit a bottom portion 2021 of the cartridge valve stem body 202, as discussed below and shown in FIGS. 7 and 8.

Referring again to FIG. 5, a pivot pin or pin rod 42 is disposed through the coupler base 242 and the stem body 202 so that each distal side of the pivot pin 42 is positioned on either side of the coupler base 242 and disposed through respective limiting grooves 222 within a sidewall 223 of the valve cartridge 22. More particularly, the pivot pin 42 fits within a base through-hole 2022 and a stem through-hole 2422 to secure the cartridge valve stem body 202 in place within the valve cartridge 22 while allowing the stem body 202 to pivot relative to axis 17 (about transverse or perpendicular axis 19), and also rotate about axis 17. In the illustrative embodiment as shown in FIG. 5, retaining nut 38 and threading 40 are formed as one piece to make up a bonnet nut 3840. When assembled, bonnet nut 3840 sits on nut shelf 226 so that the bonnet nut 3840 is retained by the valve cartridge 22 and facilitates the coupling of the valve cartridge 22 to the valve body 16 (FIG. 4).

Figure 7:
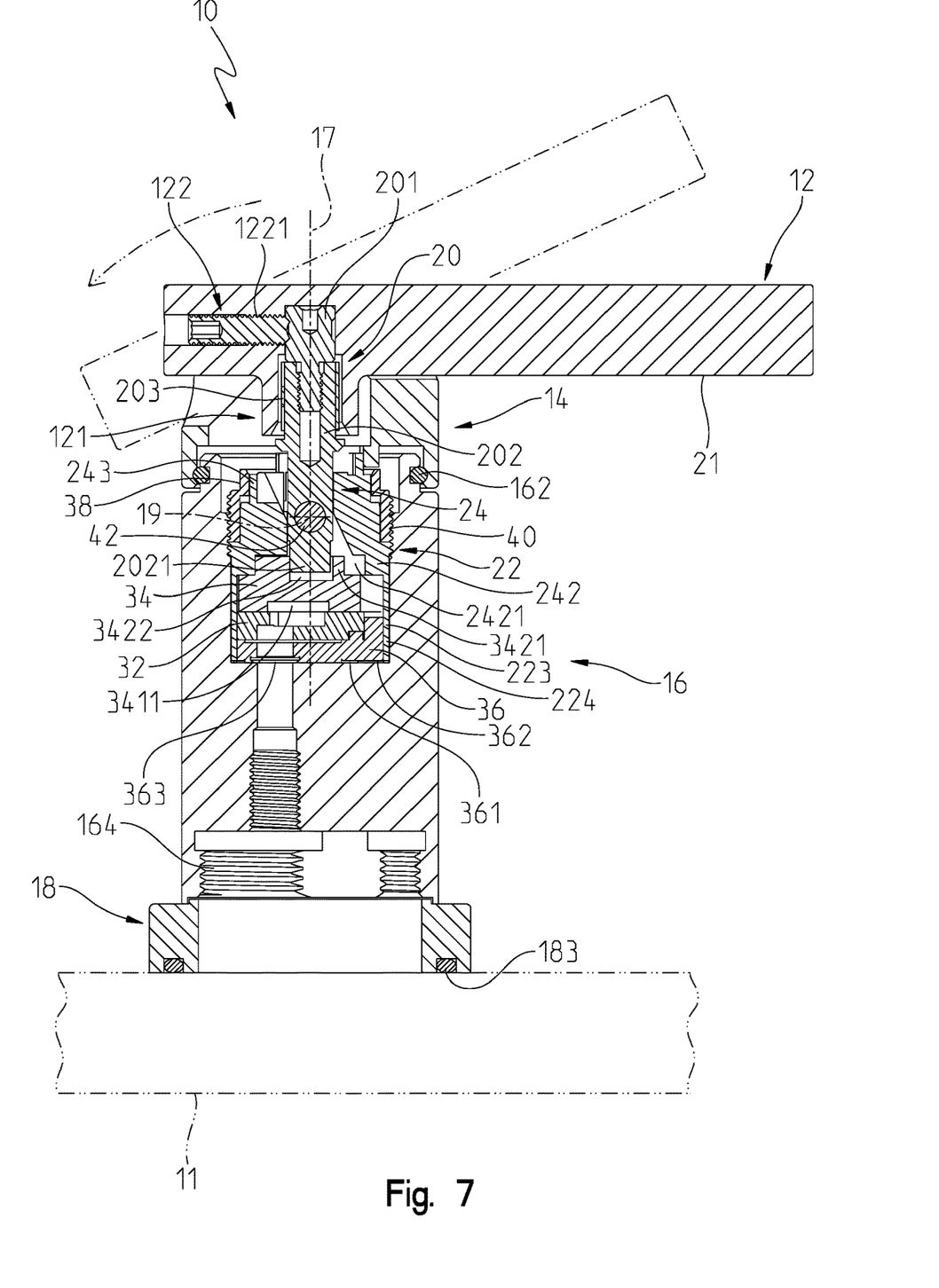
FIG. 7 is a cross-sectional view of the illustrative valve assembly of FIG. 1, taken along line 7-7 of FIG. 1.
Figure 8:
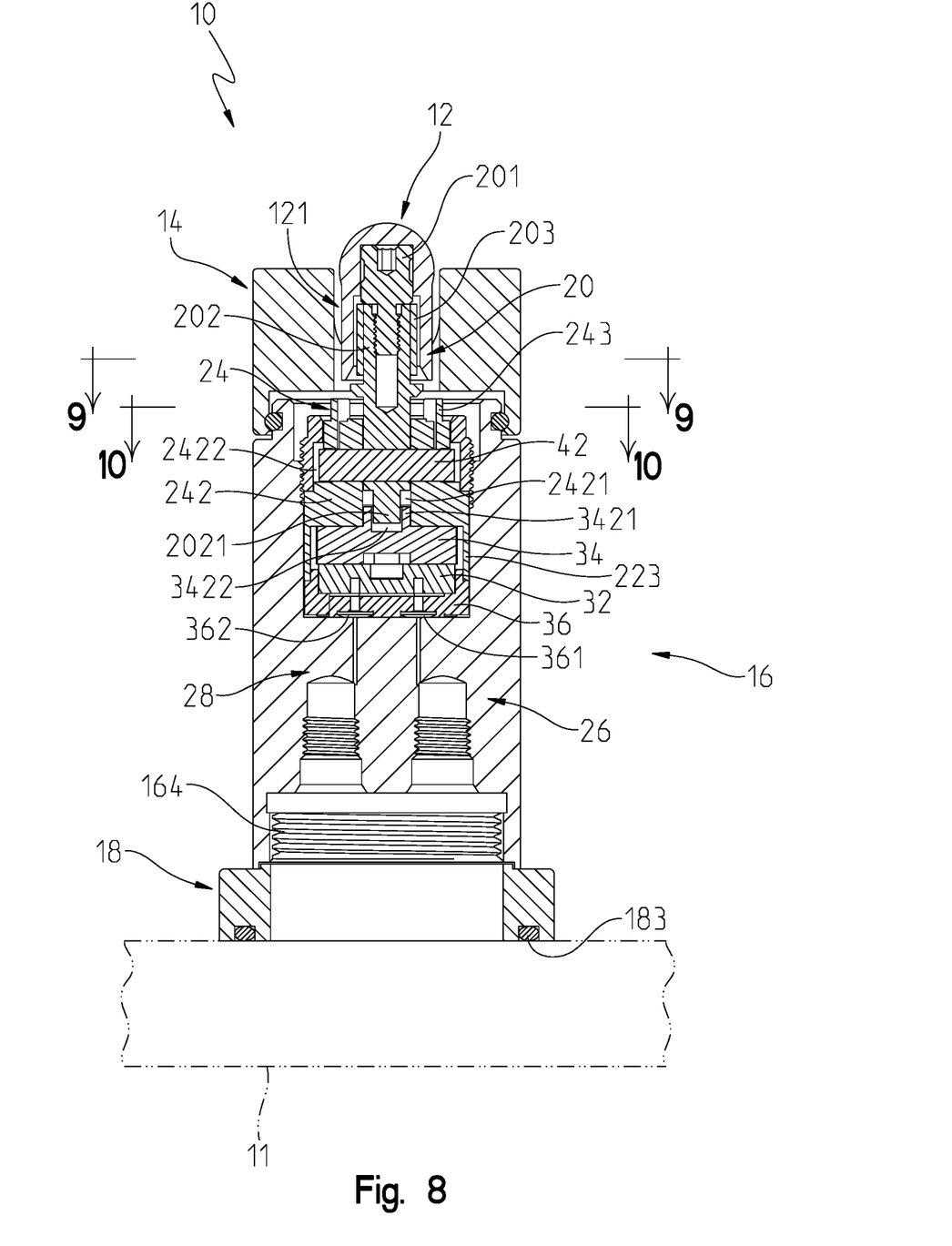
FIG. 8 is a cross-sectional view of the illustrative valve assembly of FIG. 1, taken along line 8-8 of FIG. 1.

Referring now to FIGS. 7 and 8, the bottom portion 2021 of the cartridge valve stem body 202 is illustratively disposed within a lower groove or slot 2421 formed by the coupler base 242 within the valve cartridge 22. The lower groove 2421 is formed so that the bottom portion 2021 of the cartridge valve stem body 202 may pivot as the cartridge valve stem body 202 pivots during use of the valve assembly 10. Additionally, the lower groove 2421 of the coupler base 242 is shaped to tightly accommodate the stage 3421 of the moveable valve member 34 so that the opening 3422 of the stage 3421 may stay in continuous contact with the bottom portion 2021 of the cartridge valve stem body 202 as it moves. The coupler base 242 continues through the top portion of the valve cartridge 22 as the base of cartridge valve coupler 24. As a result, the coupler base 242 rotates as the cartridge valve coupler 24 rotates. As mentioned above, the upper cartridge valve stem 201 is threaded into the cartridge stem body 202, and the upper cartridge valve stem 201 and the cartridge valve stem body 202 are disposed through the handle hub 14 and into the handle stem 121 of the handle 12 to form a friction fit coupling between the stem cover 203 of the cartridge valve stem 20 and the handle stem 121 so that the cartridge valve stem 20 moves as the handle 12 moves. For additional support, the handle engagement 122 may be inserted into the handle 12 to secure the upper cartridge valve stem 201 within the handle 12. In an illustrative embodiment, the handle engagement 122 is screwed into the handle 12 using threading 1221 for a secure fit.

Still referring to FIGS. 7 and 8, valve assembly 10 may be coupled to the faucet body or sink deck 11 via a mounting shank (not shown) via threading 164 within the valve body 16. Specifically referring to FIG. 8, the valve body 16 illustratively receives a hot water conduit 26 and a cold water conduit 28 that are in fluid communication with a hot water supply (not shown) and a cold water supply (not shown), respectively. When the valve assembly 10 is assembled and connected to the hot water supply, the hot water conduit 26 is in fluid communication with the hot water inlet 361 of the retainer 36 and the hot water aperture 321 of the stationary valve member 32. Similarly, when the valve assembly 10 is assembled and connected to the cold water supply, the cold water conduit 28 is in fluid communication with the cold water inlet 362 of the retainer 36 and the cold water aperture 322 of the stationary valve member 32. Now referring specifically to FIG. 7, the illustrative valve body 16 additionally houses a tempered or mixed water outlet 30. When the valve assembly 10 is assembled, the mixed water outlet 30 is in fluid communication with the mixed water outlet 363 of the retainer 36 and the mixed water aperture 323 of the stationary valve member 32.

As discussed above and shown in FIG. 7, the handle 12 is illustratively configured to move in a direction substantially away from the valve assembly 10. In the resting position shown as shown by the solid line 21, the recess 3411 of the moveable valve member 34 is in fluid communication with the mixed water aperture 323 of the stationary valve member 32 and the mixed outlet 363 of the retainer 36. In this position, the hot water aperture 321 and the cold water aperture 322 of the stationary valve member are blocked by the bottom face 341 so that they are not in fluid communication with the recess 3411. As a result, no fluid pathway exists between the respective water supplies (not shown) and the mixed water outlet 30. In other words, the valve assembly 10 is not operating or is closed. As the handle 12 moves, the cartridge valve stem 20 moves with the handle 12, causing the assembly formed by the cartridge valve stem 20 and the handle 12 to pivot about axis 19 defined by the pivot pin 42, causing the bottom 2021 of the cartridge valve stem body 202 to move within the groove 2421 of the coupler base 242. As the bottom 2021 of the cartridge valve stem body 202 moves with the handle 12, the moveable valve member 34 slides or translates across the top surface along pathway 99 (FIGS. 5 and 6) to bring the recess 3411 of the moveable valve member 34 in fluid communication with the hot water conduit 26 and the cold water conduit 28 while remaining in fluid communication with the mixed water outlet 30. In this position, the hot water conduit 26 and the cold water conduit 28 are in fluid communication with the mixed water outlet 30 via the recess 3411 of the moveable valve member 34.

For example, when in operation, hot water may be supplied from the hot water supply (not shown) to the hot water conduit 26, through the hot water inlet 361 of the retainer 36, and through the hot water aperture 321 of the stationary valve member 32 into the recess 3411 of the moveable valve member 34, then is released into the mixed water outlet 30 from the recess 3411 of the moveable valve member 34 via the mixed water aperture 323 of the moveable valve member 34 and the mixed water outlet 363 of the stationary valve member 32. Similarly, when in operation, cold water may be supplied from the cold water supply (not shown) to the cold water conduit 28, through the cold water inlet 362 of the retainer 36, and through the cold water aperture of the 322 of the stationary valve member 32 into the recess 3411 of the moveable valve member 34, then is released into the mixed water outlet 30 from the recess 3411 of the moveable valve member 34 via the mixed water aperture 323 of the moveable valve member 34 and the mixed outlet 363 of the stationary valve member 32.

Referring again to FIGS. 7 and 8, as the cartridge valve stem 20 rotates with the handle 12 as described below, the moveable valve member 34 rotates according to lines 97 (FIGS. 5 and 6). When the valve assembly 10 is operational and the recess 3411 of the moveable valve member 34 is in fluid communication with the water supplies (not shown), rotation of the handle 12 about axis 17 determines the temperature of the water being disposed into the mixed water outlet 30. For example, if the rotation of the handle 12 puts the recess 3411 in more communication with the hot water supply (not shown) than the cold water supply (not shown), then the water being disposed into the mixed water outlet 30 will be hotter than if the recess 3411 was in more communication with the cold water supply (not shown) than the hot water supply (not shown). The pivot pin 42 also serves as a temperature limit control. For example, if the handle 12 is rotated in one direction, eventually each of the distal ends of the pivot pin 42 will come into contact with a respective distal end of the limiting grooves 222, preventing the handle 12 from being rotated any further in the same direction. If the handle 12 is rotated in the opposite direction, eventually each of the distal ends of the pivot pin 42 will come into contact with the opposite distal end of the limiting grooves 222, preventing the handle 12 from being rotated any further in the same direction.

Figure 9:
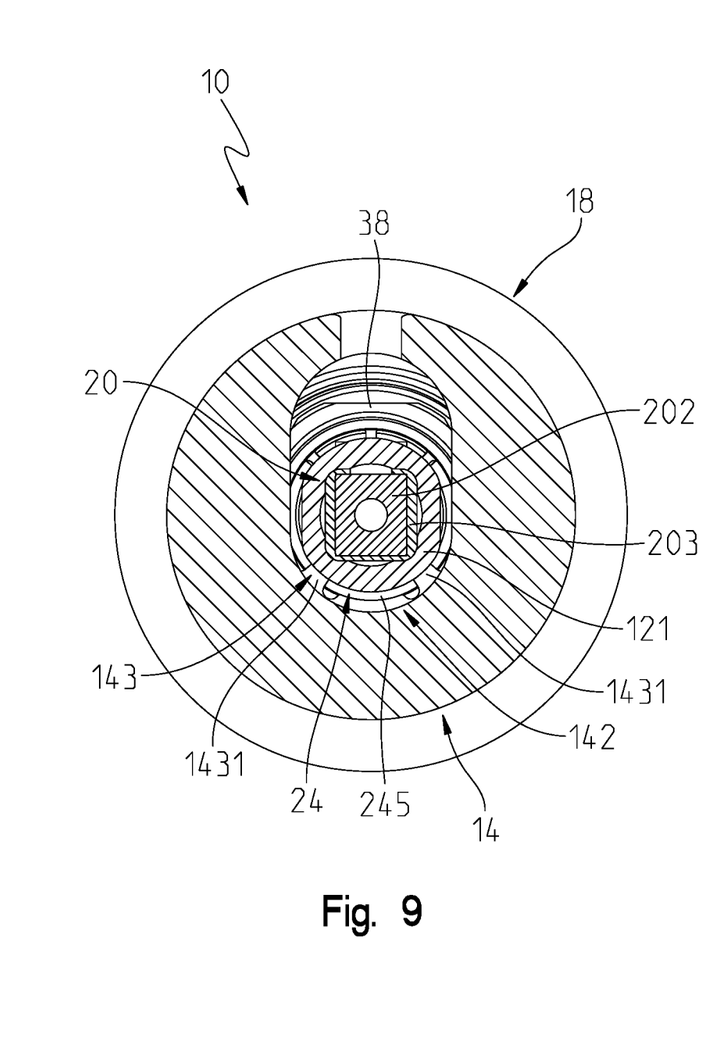
FIG. 9 is a cross-sectional view of the cartridge valve coupler of the illustrative valve assembly of FIG. 1, taken along line 9-9 of FIG. 8.

Referring now to FIG. 9, the interaction between the handle 12, the cartridge valve stem 20, the handle hub 14 and the cartridge valve coupler 24 is illustrated. More particularly, in FIG. 9, a cross-section of the valve assembly 10 is taken along line 9-9 of FIG. 8, showing the interaction of the handle stem 121, the cartridge valve stem body 202, the stem cover 203, the cartridge valve coupler 24, and the hub engagement member 143. As described above, the handle stem 121 passes through the opening 142 of the handle hub 14 to interact with cartridge valve stem 20. The stem cover 203 of the cartridge valve stem 20 friction fits within the lever stem 121 and holds the cartridge valve stem 20 in place within the handle 12. The cartridge valve stem 20 may be secured by the handle engagement 122 as shown in FIG. 5. The hub engagement member 143 extends below the lever stem 121 in a slight L-shape under the lever stem 121 to engage with cartridge valve coupler 24.

Figure 10:
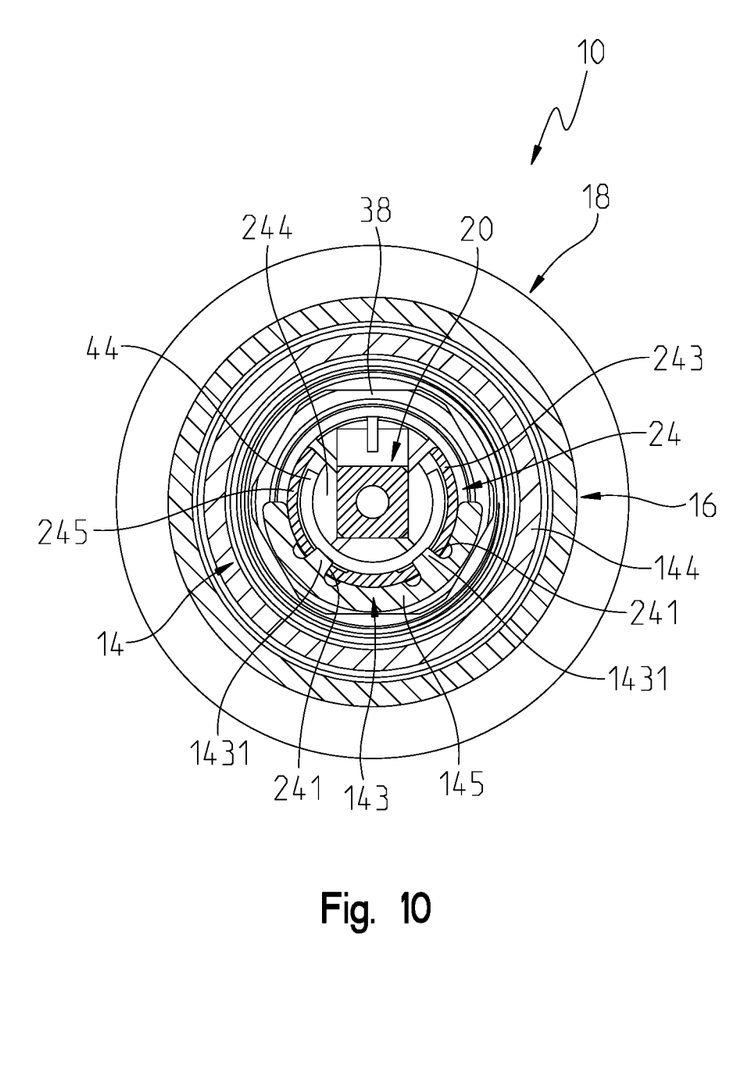
FIG. 10 is a cross-sectional view of the cartridge valve coupler of the illustrative valve assembly of FIG. 1, taken along line 10-10 of FIG. 8.

FIG. 10 further details the coupling between the hub engagement member 143 and the cartridge valve coupler 24. The prongs 1431 of the hub engagement member 143 correspond with the slots 241 formed by the tabs 245 of the cartridge engagement member 243 of the cartridge valve coupler 24. When the handle 12 is rotated or otherwise moved by a user, the cartridge valve stem 20 moves with the handle 12 due to the coupling relationship between the cartridge valve stem 20 and the lever stem 121. The movement of the cartridge valve stem 20 causes the movement of the coupler base 242 within the valve cartridge 22 (FIGS. 7 and 8) as a result of the relationship between the cartridge valve stem 20, the pivot pin 29 (FIGS. 5, 7 and 8), and the coupler base 242. Because the coupler base 242 and the cartridge engagement member 243 form the cartridge valve coupler 24 as one piece, the entirety of the cartridge valve coupler 24 moves with the coupler base 242. When the cartridge valve coupler 24 moves, the handle hub 14 moves because of the coupling relationship between the hub engagement member 143 and the cartridge engagement member 243 via the prongs 1431 and the slots 241 respectively. The described events happen substantially simultaneously with the movement of the handle 12 by the user.

Figure 11:
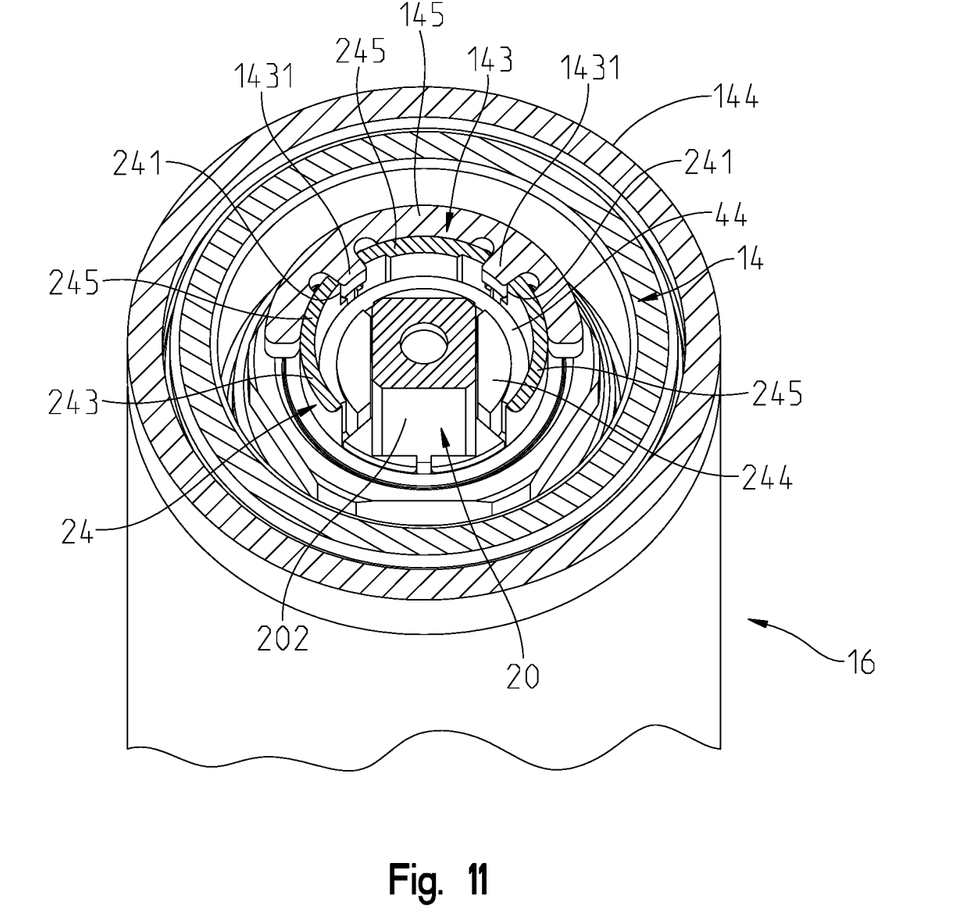
FIG. 11 is a perspective view, in cross-section, of the cartridge valve coupler between the valve stem and the handle hub.

FIG. 11 offers another cross-section view of the interaction between the hub engagement member 143 and the cartridge engagement member 243. As shown, a retainer 44, such as a spring clip, is received around inner tabs 244 of the cartridge valve coupler 24, illustratively between the inner tabs 244 and the cartridge engagement member 243, to assist in retaining the connection between the cartridge valve coupler 24 and the valve stem 20. More particularly, the spring clip 44 radially constricts the inner tabs 244 to tighten it against the valve stem 20, thus increasing friction as the valve stem 20 moves.

Although the invention has been described in detail with reference to certain preferred embodiments, variations and modifications exit within the spirit and scope of the invention as described and defined in the following claims. For example, although the invention has been described in detail with reference to a closed mixing valve cartridge, the invention may also be used in conjunction with an open mixing valve cartridge or any other type of valve for which a connection between a handle hub and a valve cartridge may be desired.

The invention claimed is:

1. A valve assembly for a faucet, the valve assembly comprising:
    a valve body defining a longitudinal axis;
    a valve cartridge supported by the valve body, the valve cartridge including a cartridge housing, a moveable valve member received within the cartridge housing, and a longitudinally extending valve stem operably coupled to the moveable valve member;
    a handle operably coupled to the valve stem so that the valve stem rotates simultaneously with the handle;
    a handle hub supported for rotation relative to the valve body; and
    a coupler supported by the cartridge housing, the coupler operably coupling the valve stem with the handle hub, the coupler including a coupler base and a coupler engagement member extending longitudinally from the coupler base and outwardly from the cartridge housing, the coupler base being disposed at least partially around the valve stem, and the coupler engagement member coupled to the handle hub;
    wherein the coupler engagement member includes a plurality of circumferentially spaced tabs, and a plurality of slots extending between the tabs.

2. The valve assembly of claim 1, wherein the handle comprises a lever including a longitudinally extending lever stem, and a laterally extending grip portion coupled to the lever stem.

3. The valve assembly of claim 1, wherein the coupler base is rotatably supported within the cartridge housing, and a pivot pin couples the valve stem to the coupler base.

4. The valve assembly of claim 3, wherein the coupler base and the coupler engagement member are formed as one piece.

5. The valve assembly of claim 3, wherein the handle is configured to pivot the valve stem about the pivot pin to perform a first operation in connection with a faucet, and the handle is configured to rotate the valve stem about the longitudinal axis to perform a second operation in connection with the faucet.

6. The valve assembly of claim 5, wherein the first operation is to control a flow rate of water, and the second operation is to control a temperature of water.

7. The valve assembly of claim 5, wherein the handle is configured to pivot independently of the handle hub.

8. The valve assembly of claim 1, wherein the handle hub includes a hub engagement member having a plurality of prongs received within the plurality of slots of the coupler engagement member.

9. The valve assembly of claim 8, wherein the handle hub includes an outer wall and an inner wall positioned radially inwardly from the outer wall, the plurality of prongs extending radially inwardly from the inner wall.

10. A valve assembly for a faucet, the valve assembly comprising:
    a cartridge housing;
    a valve stem disposed within the cartridge housing and extending longitudinally away from the cartridge housing;
    a coupler operably coupled to the cartridge housing, the coupler including a coupler base and a coupler engagement member coupled to and extending longitudinally away from the coupler base, the coupler base being disposed at least partially around the valve stem and including a lower groove to allow pivoting movement of the valve stem, the coupler engagement member including a plurality of circumferentially spaced slots;
    a moveable valve member received within the cartridge housing and including a top face, a bottom face, a recess formed within the bottom face, and a stage supported on the top face, the stage received within the lower groove of the coupler base and operably coupled to a lower end of the valve stem;
    a lever operably coupled to the valve stem so that the valve stem and the moveable valve member move concurrently with the lever; and
    a handle hub including a hub engagement member having a plurality of prongs that cooperate with the slots of the coupler engagement member so that the valve stem and the moveable valve member rotate simultaneously with the coupler engagement member and the handle hub.

11. The valve assembly of claim 10, further comprising a stationary valve member received within the cartridge housing and including a top face, a bottom face, a first inlet aperture, a second inlet aperture, and an outlet aperture, wherein the top face of the stationary valve member contacts the bottom face of the moveable valve member and the recess of the moveable valve member is configured to be in selective fluid communication with at least one of the first inlet aperture, the second inlet aperture, and the outlet aperture of the stationary valve member.

12. The valve assembly of claim 11, further comprising a retainer coupled to the cartridge housing and the stationary valve member, the retainer including a first inlet, a second inlet, and an outlet in fluid communication with the first inlet aperture, the second inlet aperture, and the outlet aperture of the stationary valve member, respectively.

13. The valve assembly of claim 11, wherein the lever is configured to pivot the valve stem and place the moveable valve member in selective communication with at least one of the first inlet aperture and the second inlet aperture of the stationary valve member.

14. The valve assembly of claim 10, wherein the coupler base is rotatably supported within the cartridge housing, and a pivot pin couples the valve stem to the coupler base.

15. The valve assembly of claim 14, wherein the lever is configured to pivot the valve stem about the pivot pin to control a flow rate of water from a faucet, and the handle is configured to rotate the valve stem about a longitudinal axis to control a temperature of water from the faucet.

16. The valve assembly of claim 10, wherein the handle hub includes an outer wall and an inner wall positioned radially inwardly from the outer wall, the plurality of prongs extending radially inwardly from the inner wall.

17. A faucet assembly, comprising:
a valve body defining a longitudinal axis and including a hot water inlet, a cold water inlet, and a mixed water outlet;
a valve cartridge received within the valve body, the valve cartridge including:
a cartridge housing;
a retainer including a hot water inlet, a cold water inlet, and a mixed water outlet in fluid communication with the hot water inlet, the cold water inlet, and the mixed water outlet of the valve body respectively;
a stationary valve member coupled to and position above the retainer, the stationary valve member including a hot water inlet aperture, a cold water inlet aperture, and a mixed water outlet aperture in fluid communication with the hot water inlet, the cold water inlet, and the mixed water outlet of the retainer respectively, the stationary valve member further including a top face;
a moveable valve member positioned above the stationary valve member, the moveable valve member including a top face, a bottom face, a recess formed by the bottom face, and a stage disposed on the top face, the stage forming an opening, wherein the bottom face of the moveable valve member contacts the top face of the stationary valve member and the recess is configured to be in selective fluid communication with at least one of the hot water inlet aperture, the cold water inlet aperture, and the mixed water outlet aperture of the stationary valve member;
a coupler received within the cartridge housing, the coupler including a coupler base and a coupler engagement member;
the coupler base including a groove receiving the stage of the moveable valve member and including a through-hole;
a valve stem received within the coupler, a lower portion of the valve stem disposed within the groove formed by the coupler base so that a lower end of the valve stem is received by the opening of the stage of the moveable valve member and is configured to move within the groove of the coupler;
a pivot pin received within the through-hole of the coupler base and supporting the valve stem for pivoting movement; and
the coupler engagement member coupled to and extending away from the cartridge housing and disposed at least partially around the valve stem, the coupler engagement member defining a plurality of slots;
a lever coupled to the valve stem so that the valve stem and the moveable valve member move simultaneously with the lever; and
a handle hub including a hub engagement member having a plurality of prongs that correspond with and couple to the slots of the coupler engagement member so that the valve stem and the moveable valve member rotate simultaneously with the coupler engagement member and the handle hub.

18. The faucet assembly of claim 17, wherein rotation of the lever about the longitudinal axis controls the temperature of water flow from the valve cartridge, and pivoting of the lever about an axis perpendicular to the longitudinal axis controls the flow rate of water from the valve cartridge.

19. The faucet assembly of claim 17, further comprising a bonnet nut to hold the valve cartridge within the valve body.

20. A valve assembly for a faucet, the valve assembly comprising:
a valve body defining a longitudinal axis;
a valve cartridge supported by the valve body, the valve cartridge including a cartridge housing, a moveable valve member received within the cartridge housing, and a longitudinally extending valve stem operably coupled to the moveable valve member;
a handle operably coupled to the valve stem so that the valve stem rotates simultaneously with the handle;
a handle hub supported for rotation relative to the valve body and including a hub engagement member;
a coupler supported by the cartridge housing, the coupler operably coupling the valve stem with the handle hub, the coupler including a coupler base and a coupler engagement member extending longitudinally from the coupler base and outwardly from the cartridge housing, the coupler base being disposed at least partially around the valve stem, and the coupler engagement member coupled to the hub engagement member of the handle hub;
wherein a slot is defined by one of the coupler engagement member and the hub engagement member, and a prong is defined by the other of the hub engagement member and the coupler engagement member, the prong being received within the slot so that the valve stem and the moveable valve member rotate simultaneously with the coupler engagement member and the handle hub.

21. The valve assembly of claim 20, wherein:
the coupler engagement member includes a plurality of circumferentially spaced tabs, the slot extending between the tabs; and
the hub engagement member includes the prong received within the slot of the coupler engagement member.

22. The valve assembly of claim 21, wherein the handle hub includes an outer wall and an inner wall positioned radially inwardly from the outer wall, the prong extending radially inwardly from the inner wall.

* * * * *